No. 684,821. L. T. HOOD. Patented Oct. 22, 1901.
BICYCLE.
(Application filed Oct. 12, 1899.)
(No Model.)
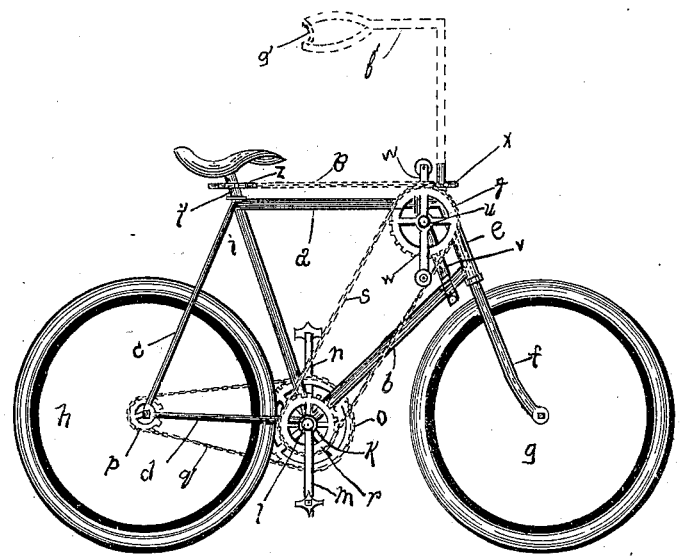

United States Patent Office.

LOUIS T. HOOD, OF CATLETTSBURG, KENTUCKY.

BICYCLE.

SPECIFICATION forming part of Letters Patent No. 684,821, dated October 22, 1901.

Application filed October 12, 1899. Serial No. 733,453. (No model.)

*To all whom it may concern:*

Be it known that I, LOUIS T. HOOD, a citizen of the United States, residing at Catlettsburg, in the county of Boyd, State of Kentucky, have invented certain new and useful Improvements in Bicycles; and I do hereby declare the following to be a full, clear, and exact description of the invention, such as will enable others skilled in the art to which it appertains to make and use the same.

My invention relates to bicycles, and has for its object to provide auxiliary driving means therefor, as also means for steering the bicycle when the hands are removed from the handle-bars.

With these objects in view my invention consists in securing upon the crank-axle of the ordinary bicycle, in addition to the regular sprocket, a second sprocket, from which leads a chain to a sprocket journaled upon a support within the inclosure of the frame and adjacent the head of the latter. Upon the axle of the last-named sprocket are arranged cranks to be operated with the hands.

The tubular extension from the crown of the front forks is continued to extend slightly above the usual clamp for holding the handle-bars in place, and upon the upper end of said tube is secured a sprocket-wheel. The seat-post is rotatably mounted in the seat-tube and bears a sprocket-wheel which is connected, by means of a chain, to the first-named sprocket, so that as the seat-post is rotated the front wheel carried, by the front fork, will be turned to one side or the other.

In the drawing forming a portion of this specification I have shown a perspective view of a bicycle constructed in accordance with my invention.

Referring now to the drawing, I have shown a bicycle comprising the ordinary frame, comprising top bar $a$, bottom bar $b$, rear fork $c$, tie-rods $d$, and head $e$. The usual front fork $f$, with its tubular extension, is employed, as also the common arrangement of front and rear wheels $g$ and $h$, respectively.

At the lower end of the seat-tube $i$ is the usual crank-hanger $k$, containing a crank-axle $l$, having cranks $m$ and $n$ thereon and bearing a sprocket $o$, having connection with the usual rear sprocket $p$ through the medium of a chain $q$. Upon the axle $l$ is also arranged a second and smaller sprocket $r$, connected through the medium of a chain $s$ with a sprocket $t$, carried by an axle $u$, journaled in a support $v$, extending from the bottom bar to the top bar of the machine, as shown.

Upon the ends of the axle $u$ I secure hand-cranks $w$, through the medium of which the sprocket $t$ may be rotated and its motion regulated at will.

Upon the upper end of the tubular extension of the front fork $f$, which extends upon the head $e$ of the frame, I arrange a small sprocket $x$. The seat-post is rotatably mounted in the seat-tube $i$, and upon said post is arranged a sprocket $z$, connected with the sprocket $x$ through the medium of a chain B, whereby when the seat and its post are oscillated the front wheel may be moved from side to side and the bicycle thus steered.

Instead of a steering means described in the above paragraph the tubular extension $f$ may be continued upwardly to a point about opposite the shoulders of the average rider. Upon the upper end of this extension may be secured a handle-bar $f'$, extending rearwardly and having its ends brought together, as shown at $g'$, which portion is made to conform to the chest of the operator. In steering a device to one side, as above described, it will be but necessary to turn the body from one side to the other, which will turn the front wheel through the medium of the upright $e$ and the handle-bar $e'$.

It will be readily understood that any-sized sprockets may be employed that appear suitable and also that the specific construction and arrangement of the parts of my improved bicycle may be altered without departing from the spirit of my invention.

Having thus described my invention, what I claim as new, and desire to secure by Letters Patent, is—

A bicycle comprising a frame, a fork pivoted therein, and having a vertical extension, said extension projecting above the frame, a wheel mounted between the forks, a wheel mounted in the frame, a sprocket-wheel upon the last-named wheel, a crank-axle journaled transversely of the frame, a sprocket-wheel mounted upon each end of the crank-axle, cranks mounted exteriorly of the sprocket-wheels, an upright bar clamped upon and connecting the top and bottom bars of the frame, a second crank-axle journaled upon the upright bar, a sprocket-wheel upon the second-named crank-axle, cranks mounted upon the ends of the second-named crank-axle, handles upon the cranks, a chain connecting the sprocket of the second-named crank-axle with the sprocket of the first-named crank-axle, a second chain connecting the other sprockets of the first-named crank-axle with the sprocket of the rear wheel, a seat-post pivotally mounted in the frame, a sprocket-wheel mounted upon the seat-post, a sprocket-wheel mounted upon the vertical extension of the front fork, above the frame, and a chain connecting the sprocket-wheels of the vertical extension of the front fork and seat-post, whereby the bicycle may be steered by a rotary movement of the body of the rider, with the seat-post as a pivot.

In testimony whereof I affix my signature in presence of two witnesses.

LOUIS T. HOOD.

Witnesses:
J. B. WILLIAMS,
W. B. YOST.